April 23, 1963   L. VAN DER MEULEN   3,087,040
DEVICE FOR WELDING THERMOPLASTIC MATERIAL
Filed Oct. 30, 1961
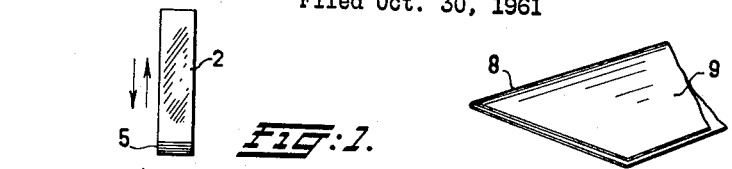
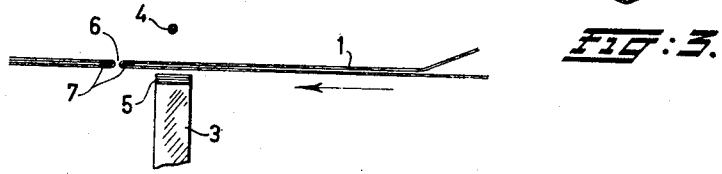
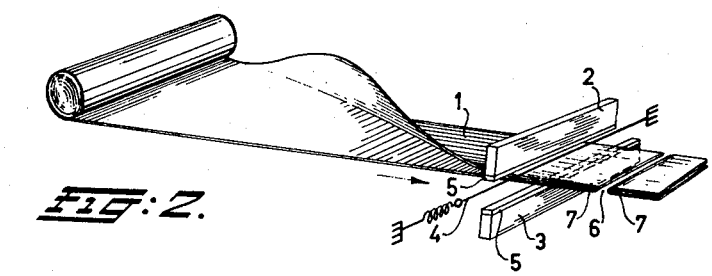
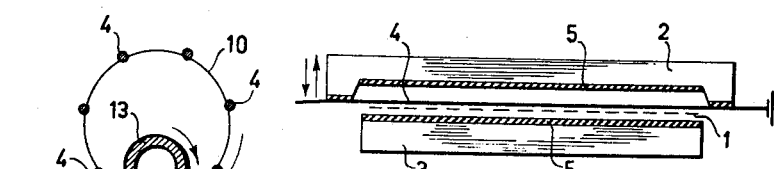
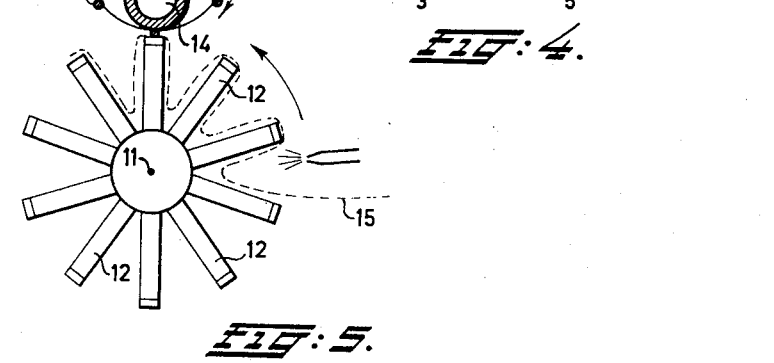
INVENTOR.
LEONARD VAN DER MEULEN
BY
ATTORNEY

United States Patent Office 3,087,040
Patented Apr. 23, 1963

3,087,040
DEVICE FOR WELDING THERMOPLASTIC MATERIAL
Leonard van der Meulen, Oranje Nassaulaam 30, Amsterdam, Netherlands
Filed Oct. 30, 1961, Ser. No. 148,557
Claims priority, application Netherlands Nov. 28, 1960
1 Claim. (Cl. 219—19)

The invention relates to a device for providing two parallel welding seams in at least two sheets or webs of thermoplastic material and simultaneously severing the material between said welding seams.

Devices of the kind are known in the art comprising a heated element consisting of a metal rod with a knife shaped rib, an electrical heating element and usually also a thermo regulator being disposed in a bore, which is provided in the rod. In operation this rod is lowered through the layers of thermoplastic material e.g. polyethylene, the material being softened owing to the heat thereby melting, so that on cutting through the material on either side of the produced incision the molten material simultaneously coalesces to thereby constitute a welding seam. The knife shaped rib in its movement is stopped by a pressure face, which is often provided with a heat resistant protective coating, the said pressure face supporting the layers to be welded during treatment. This known device, however, has the inconvenience that much energy is lost owing to heat radiation of the heated rod. Moreover it has appeared that the rod after having been used for some time is liable to distortion, which even in the event of special and expensive materials cannot be avoided in practice.

It has further been found that the known welding device is not reliable to such an extent that reproduceable, powder- and airtight welding seams are obtained. These inconveniences are in particular encountered when the treatment is performed transversely to a doubled web of material in order to manufacture so called "side weld" bags for which purpose the web is intermittently fed between the heated element and the pressure face. There are also embodiments known in which flat heating elements are disposed against the rod; in this case the heat economy is naturally still more unfavorable than in the previously described construction.

It is an object of the invention to eliminate the inconveniences described and to provide a method for treatment of a continuously fed web according to a particularly advantageous embodiment, whereby by means of a simple construction a considerable increase of production can be achieved.

A further object of the invention is to provide a heated element which has a very low heat capacity, in order to shorten the time periods required for heating the element and subsequently cooling it.

Another object of the invention is to avoid the distortion of the heated element.

A still further object of the invention is to obtain very reliable and tight welding seams even with material of lesser quality, by pressing the material on either side of the incision immediately after its melting, which is of particular importance in the vicinity of a fold of the bottom where the layers of material as a rule deviate slightly. This pressure cannot be effected by means of a heated rod of the known devices.

Another object of the invention is to be able to supply the material continuously at a speed which corresponds to the speed of the heating element whereby the material is capable of forming loops in order to achieve the most favourable production rates with retention of high graded welding seams.

The invention further aims at obtaining a simple construction and operation of the device by combining a number of sealing units into one or more cylindrical elements.

Another object of the invention is to avoid a local accumulation of heat in the device by making the operating period of each unit a fraction of the subsequent period of rest.

The invention further contemplates the elimination of heat accumulation in the device in connection with the very high rate of production by providing cooling means.

Another object of the invention is to provide a light weight heated element with which straight welding seams are obtained without any need for a parallel guide or a great tension stress, while an easy exchange or substitution of worn parts is made possible.

A still further object of the invention is to avoid the use of electronically operated means for providing electrical energising impulses of an exactly determined duration.

Other and further objects and advantages of the invention will become apparent from the following description, taken in conjunction with the accompanying drawings, in which:

FIGURES 1 and 2 show in outline the device with a single heating wire.

FIGURE 3 shows diagrammatically a doubled sheet of thermoplastic material, both layers of which somewhat deviate in the vicinity of the fold.

FIGURE 4 shows a modified embodiment of the device according to the FIGURES 1 and 2, the heating wire being secured to the pressure element in such a way that on lowering the pressure element first the wire and thereafter the pressure element reaches the location of welding.

FIGURE 5 shows diagrammatically a modified embodiment of the device according to FIGURE 2 with a rotary pressure element.

According to the FIGURES 1 and 2 there is intermittently supplied a doubled web of thermoplastic material 1 in the direction of the arrow A, between the pressure element 2, which is movable up and down, and the pressure face 3, the web at a small height passing above the pressure face. Mounted between the pressure element 2 and the web 1 is a stretched heating wire 4. The pressure face 3 as well as the pressure element 2 are provided with a heat resistant protective coating 5, e.g. silicon rubber or asbestos, which is provided on the side of the web 1. When the web 1 is stopped, which occurs at regular intervals, corresponding to the width of the "side weld" bags to be manufactured, the pressure element 2 is lowered and abuts the heated wire 4, which is also moved along in a downward direction. When the web 1 is touched the thermoplastic material melts under the influence of the heat and the pressure of the wire 4 and in such a way that the material under the wire is cut through, while the soft material on either side of the produced incision 6 in united under the influence of the pressure of the element 2 so as to form a strong and tight welding seam 7. The pressure which directly beside the heated wire 4 is exerted by the element 2 is in particular of importance on working up lesser grades of thermoplastic material and in order to obtain a tight and strong welding seam near to the fold of the doubled material. In FIGURE 3 is represented how in the vicinity of the fold 8 of a doubled web 9 of material the layers of the material slightly deviate owing to the resilience of the material.

FIGURE 4 shows a modified embodiment of the device described. The pressure element 2 which is capable of up and down movement, is recessed on its lower side. The heating wire 4 extends over this recess. On lowering the pressure element 2 the elevated ends thereof move down the heated wire 4 and the latter reaches first a subjacent layer of material cutting through the material, softened by the heat, whereupon the pressure element 2 with the protective coating immediately presses the edges on either side of the incision made, whereby safe welding seams are guaranteed.

In FIGURE 5 an embodiment of the invention is represented in outline according to which the web of material can be continuously fed and a fast production is ensured. The heating wires 4 move in a circular path 10 and at a speed which is equal to the circumferential speed of the pressure faces 12, which are rotatable around an axis 11. Within the circular path 10 there is a cylindrical pressure element 13 which is adjacent to the path of the pressure faces 12, the said pressure element also being capable of rotary movement at a circumferential speed, which is equal to that of the wires 4 and the pressure faces 12. Through the pressure element 13 extends a conduit 14 through which a cooling fluid for instance water or air may be fed.

The effect of the device according to FIGURE 5 is as follows; a web 15 is continuously fed at a speed which is higher than the circumferential speed of the pressure faces 12. The material supplied in excess, due to a blow of air, forms loops between the pressure faces 12. The adjustment of the device is such that near to the pressure element 13 one of the heating wires 4 arrives just in front of the central portion of a pressure face 12, the pressure element 13 pressing the heated wire in the way described through the web of material 15 and pressing the welding seams constituted on either side of the disjunction to thereby realize the desired quality of the seams. The cooling medium fed through the conduit 14 prevents also at high circumferential speeds the pressure device 13 from becoming too hot, whereby the film is prevented from adhering and the welding seams cool quickly down to under the softening temperature of the thermoplastic material 15. Advantageously the web of material is fixed on the pressure faces through suction apertures in these pressure faces, the compressor, providing for the blow of air by which the loops are formed, being connected by its suction side to the suction apertures.

The same effect as produced by the device according to FIGURE 4 can be obtained with the device according to FIGURE 5 when the rotary pressure element 13 is slightly displaced in the rotational direction of the pressure faces 12, that is to say, when the axis of rotation of the pressure element 13 is situated at the left of the plane through the axes of rotation of the set of heating wires 4 and of the pressure faces 12.

The heating wires 4 are preferably stretched through resilient means, the wires 4 being advantageously energised from shortly before to shortly after the formation of welds.

Although the present invention has been disclosed in connection with a few preferred embodiments thereof, variations and modifications may be resorted to by those skilled in the art without departing from the principles of the invention, as disclosed in the foregoing description and defined by the appended claim.

What is claimed is:

A device for cutting at least two superposed layers of thermoplastic sheet material along a predetermined line and simultaneously welding together the layers along parallel seams at the opposite sides of said line along which cutting is effected: said device comprising
   pressure members having heat resistant faces relatively movable toward and away from each other with the layers of thermoplastic sheet material passing therebetween,
      one of said pressure members having an elongated recess therein in which said heat resistant face of said one pressure member is located, and shoulders at the ends of said recess projecting beyond said heat resistant face in the recess toward the other pressure member, and
     the other of said pressure members being dimensioned to be received in said recess. and
   at least one longitudinally tensioned heating wire movably mounted so as to be disposed between said faces during movement of the latter toward each other,
     said heating wire extending parallel to and beyond the ends of said recess of said one pressure member so as to be initially engaged by said shoulders and thereby pressed against said face of the other pressure member for cutting through the layers of thermoplastic sheet material disposed between said pressure members during movement of the latter toward each other and, thereafter, further movement of the pressure members toward each other causes said faces of the pressure members to exert pressure upon the layers of thermoplastic sheet material at the opposite sides of said heating wire to ensure the welding together of said layers.

References Cited in the file of this patent
UNITED STATES PATENTS

| | | |
|---|---|---|
| 2,627,893 | Williams | Feb. 10, 1953 |
| 2,711,779 | Carland | June 28, 1955 |
| 2,726,706 | Hakomaki | Dec. 13, 1955 |
| 2,796,913 | Fener et al. | June 25, 1957 |
| 2,834,395 | Russell et al. | May 13, 1958 |
| 3,015,600 | Cook | Jan. 2, 1962 |

FOREIGN PATENTS

| | | |
|---|---|---|
| 675,008 | Great Britain | July 2, 1952 |